Jan. 25, 1949.  W. B. ZERN  2,460,114
TANK FLUSH BALL AND GUIDE SUPPORT
Filed March 29, 1945  3 Sheets-Sheet 1
Fig.1.
Fig.2.
Fig.3.
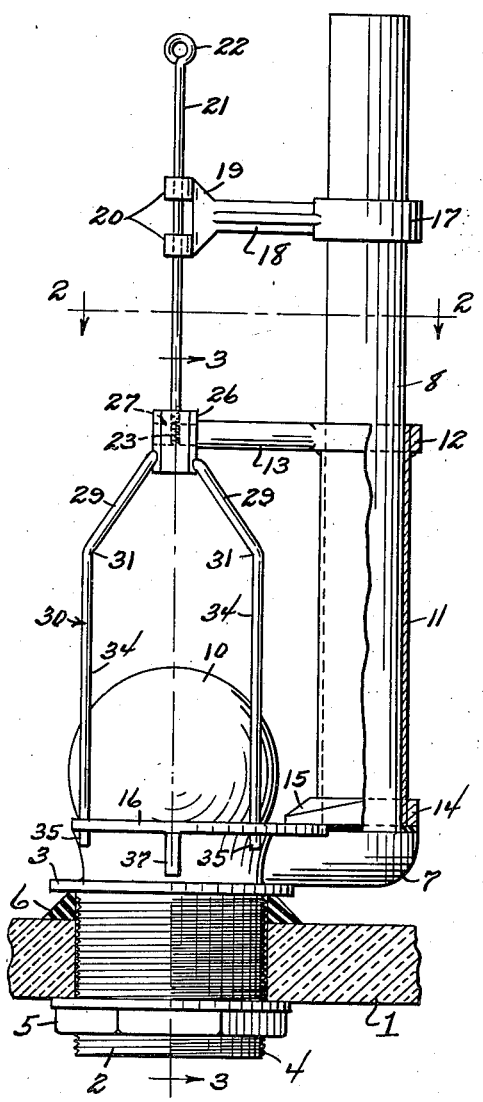
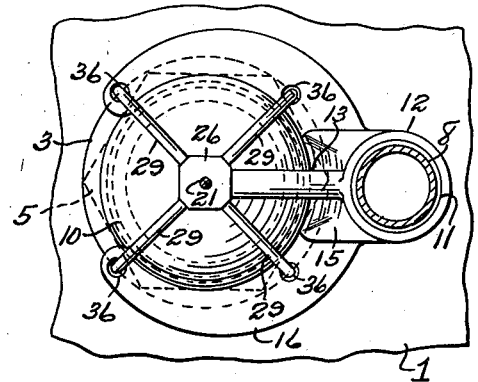
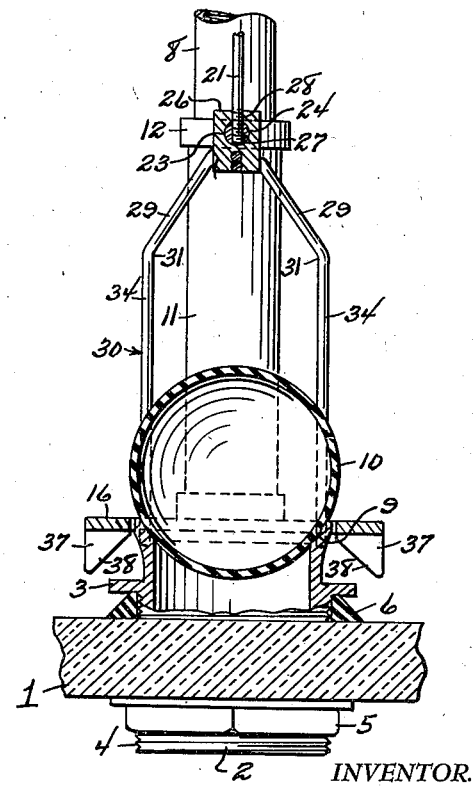
INVENTOR.
Warren B. Zern
BY Victor J. Evans & Co.
ATTORNEYS Jan. 25, 1949.                    W. B. ZERN                    2,460,114
                       TANK FLUSH BALL AND GUIDE SUPPORT
Filed March 29, 1945                                      3 Sheets-Sheet 2
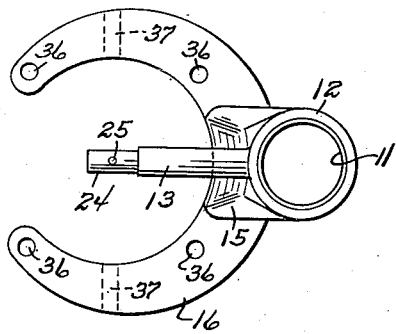
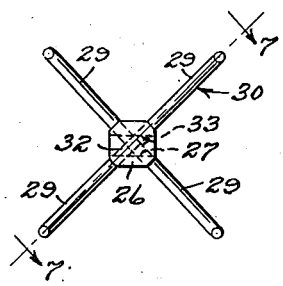
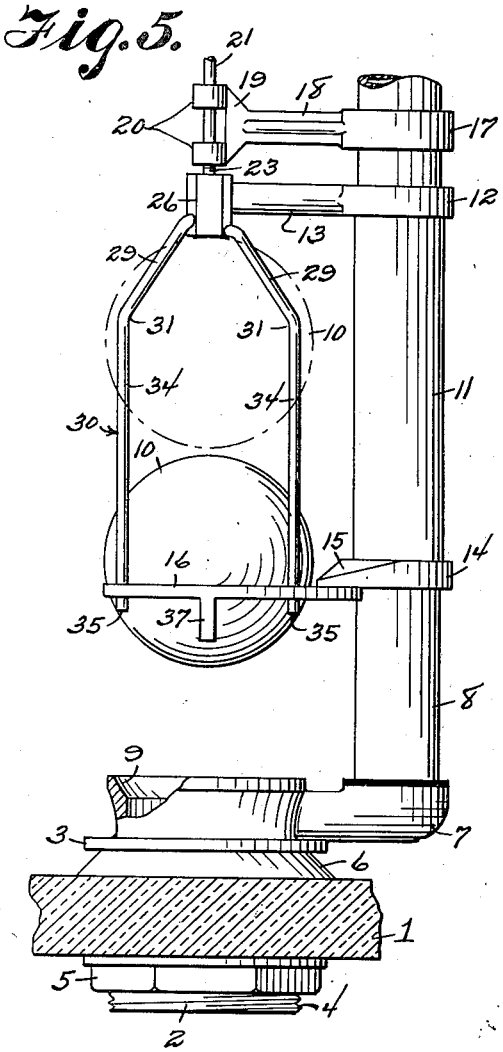
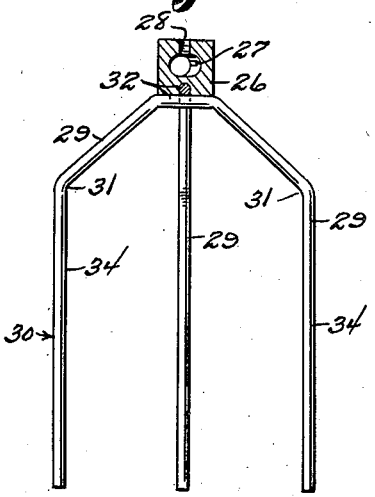
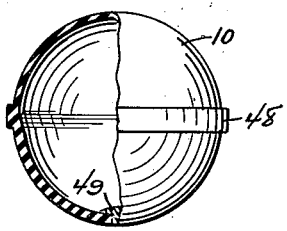
INVENTOR.
Warren B. Zern
BY Victor J. Evans & Co.
ATTORNEYS Jan. 25, 1949. W. B. ZERN 2,460,114
TANK FLUSH BALL AND GUIDE SUPPORT
Filed March 29, 1945 3 Sheets-Sheet 3
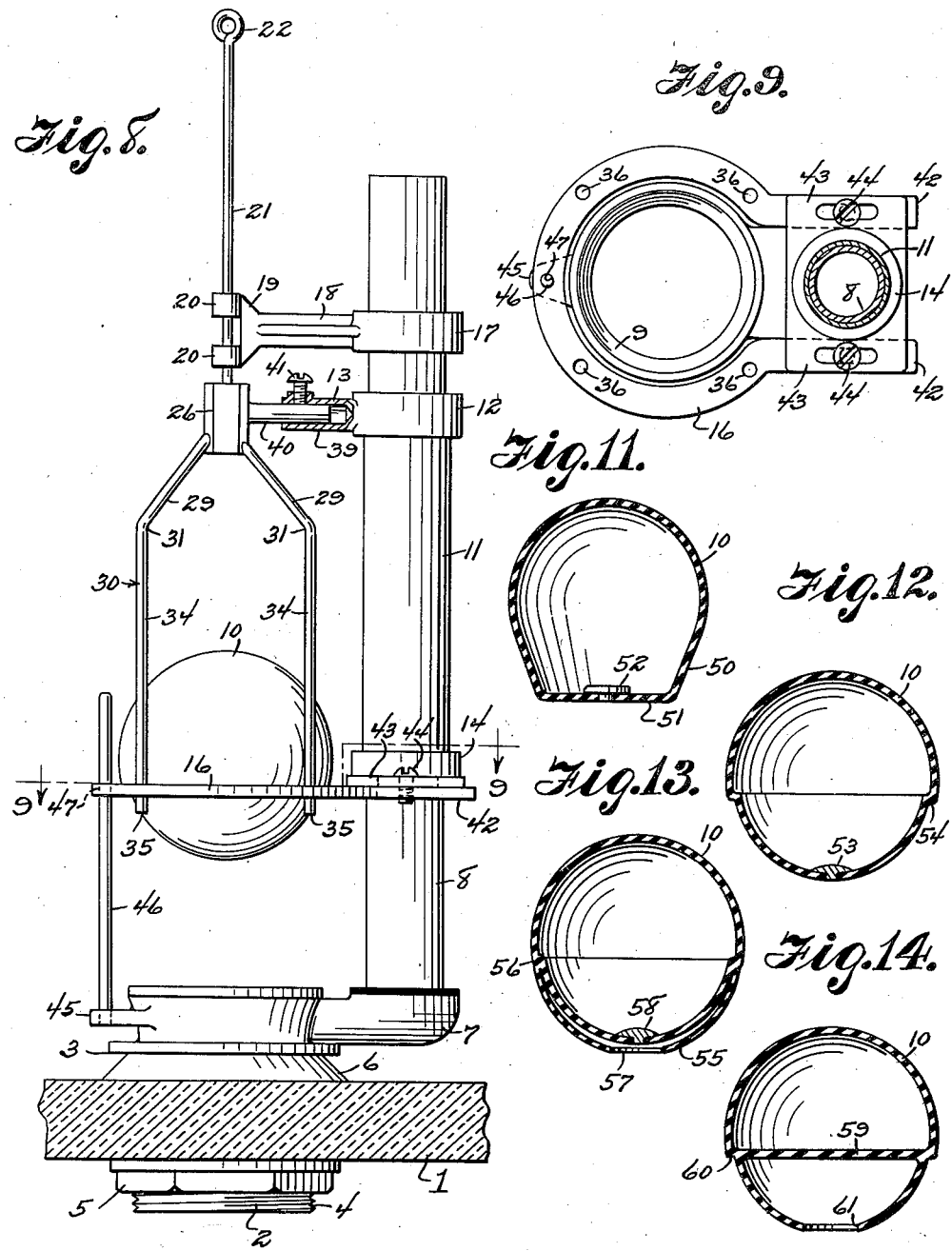
INVENTOR.
Warren B. Zern
BY Victor J. Evans & Co.
ATTORNEYS Patented Jan. 25, 1949

2,460,114

UNITED STATES PATENT OFFICE 2,460,114

TANK FLUSH BALL AND GUIDE SUPPORT

Warren B. Zern, Pottstown, Pa.

Application March 29, 1945, Serial No. 585,556

4 Claims. (Cl. 4—57)

My present invention, in its broad aspect, has to do with improvements in float valves for flush tanks, and more particularly, to ball valves and guide cages therefore, whereby the ball valve is caused to properly seat, which cage may be used to unseat the ball valve in the event of its becoming stuck. More particularly, it is my purpose to provide an open wire cage having a circular or semi-circular base rim of a diameter slightly larger than the outside diameter of the water discharge pipe of a toilet flush tank whereby the rim normally has a position of rest outside of and flush with the valve outlet pipe, which rim has depending outwardly and downwardly angled guide feet to engage the periphery of the water discharge pipe to center and guide the rim. The rim is connected with the bottom end of a sleeve loosely mounted for sliding movement on the flush tank overflow pipe, which sleeve has an arm at its upper end over the end of which removably fits an attaching block at the top of the cage which is held in place on the arm by a vertical wire rod engaging in the arm through an opening in the block. The block carries the ball cage wires which confine and guide the ball and the wires are removably engaged with the rim. The vertical rod slides through a fixed guide arm on the overflow pipe and the wires are bent inwardly and upwardly at an angle to the block to center the ball. My ball is materially improved in many respects, and in another preferred form, I provide means for adjusting the rim and cage, and guiding the rim by means of a guide rod. My device is efficient, practical, sturdy and simple in construction, and assures proper and accurate seating of the valve.

Other and equally important objects and advantages of my invention will be apparent from the following description and drawings, and it is pointed out that changes in form, size, shape, materials, and construction and arrangement of parts are permissible and within the purview of my broad inventive concept, and the scope of the appended claims.

In the drawings wherein I have illustrated preferred forms of my invention:

Figure 1 is a side elevation of my invention;

Figure 2 is a transverse section on the line 2—2 of Figure 1;

Figure 3 is a vertical section taken on the line 3—3 of Figure 1;

Figure 4 is a top plan view of the sleeve, arm, and rim with the wire cage removed;

Figure 5 is an enlarged detail showing the cage and ball in raised position;

Figure 6 is a top plan view of the cage;

Figure 7 is a section on the line 7—7 of Figure 6;

Figure 8 is a side elevation of a modified form of my device;

Figure 9 is a transverse section on the line 9—9 of Figure 8;

Figure 10 is a view, partly in section, of a modified form of weighted ball with a rim engaging flange;

Figure 11 is a section of another modified form of ball which is elongated toward the base;

Figure 12 is a section of a modified form of weighted ball with a rim engaging off-set;

Figure 13 is a section of a modified form showing a live rubber skirt; and

Figure 14 is a section of a modified form with an offset, an air-filled seal and open bottom.

In the drawings, wherein like characters of reference are used to designate like or similar parts:

The numeral 1 designates the bottom of a toilet flush tank which has an outlet pipe 2 having a flange 3 and threaded part 4 with a clamping nut 5. A suitable watertight joint 6 is placed beneath the flange 3. Leading from the outlet pipe 2 by the connection 7 is the vertical overflow pipe 8. The inner upper edge of the outlet pipe 2 is properly formed and beveled to provide a valve seat 9 for the ball 10. The operation of the aforementioned mechanical organization is similar to all types of flush tanks in that the ball 10 is ordinarily seated to close the outlet pipe 2 in which case the tank fills to a predetermined level which is maintained until it is desired to flush the tank. Excess water passes out through the overflow pipe 8. When it is desired to flush the tank, the ball 10 is unseated and rises because of its buoyancy to the top of the water supply and follows the water level down as the flushing operation proceeds when it again rests on its seat to close the outlet pipe and permit the tank to refill. Proper operation of the mechanism as broadly defined above is subject to a number of inherent drawbacks or adverse contingencies, among which are, (1) possible improper seating of the ball valve which causes a leaky tank, or if the seating of the ball be bad, the continuous flushing of the tank resulting in loss of water, a noisy toilet and the like, (2) failure to fully, accurately and promptly open the outlet pipe upon flushing to insure a strong and effective flow of water into the toilet due to derangement of parts and the like, (3) inadequacies in the construction of the ball, per se, which affects the operation of the entire organization, and (4) failure to provide for adjustments, where adjustments are necessary, and a multiplicity of small, or intricate, or fragile parts likely to get out of order or to become deranged or inapt in operation due to wear, continuous use, and the like. My present invention, among other things, is designed to overcome these and other defects and drawbacks in conventional flush valve organizations.

The vertical overflow pipe 8 has slidably mounted thereon a sleeve 11 which has a collar 12 at its upper end and an outwardly extending arm 13, and another collar 14 at its lower end having a beveled lip 15 to which is connected a semicircular ring or rim 16. As shown in Figure 3, the inner diameter of the rim 16 is slightly greater than the outer diameter of the outlet pipe 2 so that when the sleeves and rim are in the position shown in Figures 1 and 2, the top of the ring fits flush with the top of the outlet pipe. Fixed to the overflow above and considerably spaced from the sleeve is a collar 17 having an arm 18 with a bifurcated end 19 having vertically bored enlargements 20 guiding and supporting a vertical rod 21. The rod 21 has an eye 22 for engagement by the valve unseating apparatus (not shown), and a threaded end 23. The arm 13 has a reduced end 24 formed with a threaded bore 25 to receive the threaded end of the vertical rod 21. A block 26 has an enlarged opening 27 to receive the reduced end 24 to removably mount the block on the arm, and has a vertical bore 28 to receive the rod 21 whereby the rod 21 when threaded into the arm anchors the blocks in place, and releases the block when detached. The block 26 is provided with crossed channels in its bottom seating the tops of wires 29 forming a depending cage 30. The wires 29 extend from bight portions 32, which are crossed at right angles as at 33, and are bent downwardly and outwardly at an angle as at 31, and then downwardly and vertically as at 34 to form the body of the cage. The ends 35 of the cage wires fit loosely in openings 36 in the ring or rim 16. Formed on the bottom of the ring or rim are guide fingers 37 which have outwardly angled or beveled inner edges 38. The ball 10 is contained in the cage as shown in Figures 1, 3 and 5. In operation, the ball is normally seated on its valve seat 9 and the rim 16 is in the position shown in Figure 3. To flush the tank, the rod 21 is pulled upwardly lifting the block 26, the cage 30, and through the arm 13 the sleeve, the rim 16 and the ball 10. The ball having been released, it rises to the top of the cage as shown in Figure 5, and rests in the crown formed by the angled parts 31 of the cage wires 29 where it is directly centered above its valve seat. As the liquid level drops upon flushing the tank, the ball moves down the cage and rests on the rim 16 which reassumes its position shown in Figures 1 and 3 and properly places the ball on its seat to terminate the flushing operation after which the tank refills. Proper centering of the rim 16 is insured by the angled guide fingers 37.

In Figures 8 and 9, I have shown a modified form in which the arm 13 is sectional, one section 39 is tubular to telescopingly and adjustably receive the section 40. A clamping screw 41 is provided to hold the section in adjusted position to regulate the length of the arm. The ring or rim 16 in this form of my invention has spaced parallel arms 42 at the back slidably beneath plate extensions 43 on the lower collar 14 which are slotted to adjustably receive the adjusting screws 44 carried by the arms 42. By these means, adjustments may be made of my invention with reference to the overflow pipe, valve seat and the like. On the outlet pipe 2, I provide an ear 45 to which is attached a vertical guide rod 46 passing through an opening 47 in the ring or rim to insure accuracy in centering the ring or rim.

Referring now to Figures 10 to 14, the ball shown in Figure 10 has an outstanding annular rubber flange 48 to engage the ring or rim 16 and is weighted as at 49. The ball shown in Figure 11 is elongated as at 50 at the bottom to fit in the rim 16 and has a flat bottom 51 which is weighted as at 52. In Figure 12 my ball is weighted as at 53 and provided with an annular off-set 54 to engage the rim. In Fig. 13, I provide a live rubber skirt 55 slightly spaced from the bottom of the ball and attached beneath the off-set 56 and provided with an air opening 57. The ball is weighted as at 58. The ball of Figure 14 has a transverse partition 59 to seal the upper part of the ball airtight above the annular offset 60. The bottom part has an air vent 61. In all of these balls, the end in view is to insure accurate and proper seating and a more efficient buoyancy, as well as to improve the general construction of the ball.

From the foregoing, it is believed that the operation and advantages of my invention will be apparent, but it is again pointed out that interpretation of the scope of my invention should only be conclusive when made in the light of the subjoined claims.

It is to be understood that the use of my ball valve mechanism is not confined to flush tanks, as it will function efficiently to control the outlets of water-storage and kindred tanks.

I claim:

1. In a flush tank having an upstanding liquid drain outlet provided with a valve seat and a vertical overflow pipe adjacent thereto, the combination therewith of a guide arm extending transversely from and fixed to the overflow pipe, a rod adapted to be lifted being slidably supported in said guide arm, a sleeve underneath said guide arm and reciprocably mounted on the overflow pipe, a supporting means fixed to and extending transversely from said sleeve and over the drain outlet, said supporting means at the free end thereof having an end portion provided with a threaded opening, a block having an aperture receiving said supporting means end portion and being provided with a bore in alignment with said threaded opening, said rod extending through said block bore and threadedly engaging in said threaded opening whereby said rod, block and supporting means are rigidly joined together, a ring-like member attached to said sleeve below said supporting means, a wire cage depending from said block and anchored to said ring-like member, a buoyant ball valve loosely mounted in said wire cage and adapted to seat on the outlet valve seat to close the outlet, whereby lifting of the sleeve will free said ball valve for buoyant movement above the outlet valve seat and within the cage to open the discharge outlet, and whereby said ring-like member may drop back into superimposed engagement with the outlet independently of said ball valve causing the same to follow the receding water level in the flush tank.

2. The combination of claim 1 wherein the ring-like member has an internal diameter less than the diameter of the ball valve whereby said ball valve protrudes below the ring-like member for seating engagement with the valve seat to close off the discharge outlet.

3. The combination of claim 1 wherein the ring-like member has depending tapered guide lugs for guiding the ring-like member into concentric superimposed engagement with the outlet, said guide lugs having tapered surfaces converging toward the geometric center of the ring-like member.

4. The combination of claim 1 wherein the wire cage consists of parallel wire portions spaced equally about and fastened to the annulus and bent wire portions converging upon and secured to the supporting means.

WARREN B. ZERN.

REFERENCES CITED

The following references are of record in the file of this patent:

UNITED STATES PATENTS

| Number | Name | Date |
| --- | --- | --- |
| 306,012 | Garland | Sept. 30, 1884 |
| 369,003 | Harvey | Aug. 30, 1887 |
| 910,958 | Ruhl | Jan. 26, 1909 |
| 1,193,760 | Campbell | Aug. 8, 1916 |
| 1,593,432 | Campbell | July 20, 1926 |
| 1,668,803 | Cigol et al. | May 8, 1928 |
| 1,676,430 | Delany | July 10, 1928 |
| 1,799,770 | Wegner | Apr. 7, 1931 |
| 1,941,549 | Gannon | Jan. 2, 1934 |
| 2,257,292 | De Garmo | Sept. 30, 1941 |